United States Patent
Baglino et al.

(10) Patent No.: US 7,847,501 B2
(45) Date of Patent: Dec. 7, 2010

(54) VARYING FLUX VERSUS TORQUE FOR MAXIMUM EFFICIENCY

(75) Inventors: Andrew David Baglino, San Francisco, CA (US); Heath Fred Hofmann, State College, PA (US); Greg Grant Solberg, Berkeley, CA (US)

(73) Assignee: Tesla Motors, Palo Alto, CA (US)

( * ) Notice: Subject to any disclaimer, the term of this patent is extended or adjusted under 35 U.S.C. 154(b) by 385 days.

(21) Appl. No.: 12/044,426

(22) Filed: Mar. 7, 2008

(65) Prior Publication Data

US 2009/0224721 A1 Sep. 10, 2009

(51) Int. Cl.
*H02P 7/00* (2006.01)
(52) U.S. Cl. .................. 318/432; 318/434; 318/689
(58) Field of Classification Search .......... 318/689, 318/690, 400.02, 400.15, 700, 727, 713, 318/714, 717, 800, 801, 807, 432, 434
See application file for complete search history.

(56) References Cited

U.S. PATENT DOCUMENTS

| | | | |
|---|---|---|---|
| 5,168,204 A | | 12/1992 | Schauder |
| 5,386,186 A | | 1/1995 | Gritter |
| 5,498,945 A | * | 3/1996 | Prakash ............... 318/807 |
| 5,650,700 A | * | 7/1997 | Mutoh et al. .......... 318/432 |
| 5,659,235 A | * | 8/1997 | Yamada et al. ........ 318/801 |
| 5,740,880 A | * | 4/1998 | Miller ................... 180/446 |
| 7,023,168 B1 | * | 4/2006 | Patel et al. ............ 318/757 |
| 7,586,286 B2 | * | 9/2009 | Cheng et al. .......... 318/807 |
| 7,772,790 B2 | * | 8/2010 | Nashiki ............. 318/400.02 |

FOREIGN PATENT DOCUMENTS

| | | |
|---|---|---|
| EP | 1454787 | 9/2004 |
| JP | 62-213503 | 9/1987 |
| JP | 2002-078109 A2 | 3/2002 |

OTHER PUBLICATIONS

Hofmann, H., et al., "Speed-sensorless vector torque control of induction machines using a two-time-scale approach", *IEEE Transactions on Industry Applications*, 34(1), (Jan.-Feb. 1998), 169-177.
Hofmann, H., et al., "Stator-flux-based vector control of induction machines in magnetic saturation", *IEEE Transaction on Industry Applications*, 33(4), (Jul.-Aug. 1997), 935-942.

(Continued)

*Primary Examiner*—Lincoln Donovan
*Assistant Examiner*—Antony M Paul
(74) *Attorney, Agent, or Firm*—Patent Law Office of David G. Beck

(57) ABSTRACT

A motor in an electric vehicle can be controlled by receiving a torque command value, calculating a first flux value corresponding to a determinable efficiency of the electric vehicle at the torque command value, calculating a first torque-producing current value as a function of the torque command value and of the first flux value, and using the first flux value and the first torque-producing current value to control the motor to propel the electric vehicle.

14 Claims, 4 Drawing Sheets

OTHER PUBLICATIONS

Hofmann, H. F., et al., "Stator-flux-oriented vector control of synchronous reluctance Machines with maximized efficiency", *IEEE Transactions on Industrial Electronics*, 51(5), (Oct. 2004), 1066-1072.

Park, J. D., et al., "Design and control of high-speed solid-rotor synchronous reluctance drive with three-phase LC filter", *Conference Record of the 2005 Industry Applications Conference, 2005. Fourtieth IAS Annual Meetings*. vol. 1, (Oct. 2005), 715-722.

Park, Jae-Do, et al., "Feedforward control of high-speed solid-rotor synchronous reluctance machines with rotor dynamics model", *Conference Record of the 2004 IEEE Industry Applications Conference, 2004. 39th IAS Annual Meeting*. vol. 1, (Oct. 2004), 292-298.

Shearer, Tony L., et al., "Sensorless control of a thermoacoustic refrigerator", *J. Acoust. Soc. Am.* 116(1), (Jul. 2004), 288-293.

Wang, Guanghui, et al., "Speed-sensorless torque control of induction machine based on carrier signal injection and smooth-air-gap induction machine model", *IEEE Transactions on Energy Conversion*, 21(3), (Sep. 2006), 699-707.

"International Application Serial No. PCT/US2009/001367, International Search Report mailed May 27, 2009", 3 pgs.

"International Application Serial No. PCT/US2009/001367, Written Opinion mailed May 27, 2009", 7 pgs.

\* cited by examiner

VARYING FLUX VERSUS TORQUE FOR MAXIMUM EFFICIENCY

BACKGROUND

There are a number of negative aspects to burning fuel in an internal combustion engine to provide for transportation, such as cost, pollution, or the depletion of natural resources. Vehicles having electric or partially electric propulsion machinery address some of these problems.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Generally, a motor controller can be configured to, among other things, control the performance of a motor. In applications having a limited power supply, e.g., a battery, the motor controller can be configured to control the motor at specified or determinable efficiency or power loss. In certain electric vehicle applications, however, maximizing the efficiency can be difficult while also controlling the motor to produce a desired torque or speed. The present inventors have recognized, among other things, that the flux linkage (or "flux") of a motor in an electric vehicle can be modulated according to the desired torque to increase the efficiency or decrease the power loss of the electric vehicle throughout the operating range of the electric vehicle. In an example, a first flux value can be calculated at a desired torque value, the first flux value corresponding to a determinable (e.g., maximum) efficiency of the electric vehicle. Further, a first torque-producing current can be calculated as a function of the first flux value, and the motor of an electric vehicle can be controlled using a control signal, the control signal calculated as a function of the first flux value and the first torque-producing current.

Figure 1:
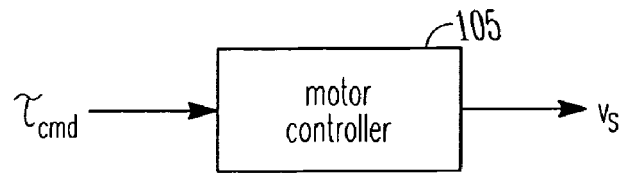
FIG. 1 illustrates generally an example of a motor controller.

FIG. 1 illustrates generally an example of a motor controller 105. In an example, the motor controller 105 is configured to receive a torque command value ($\tau_{cmd}$) and output a control signal ($V_s$) for controlling a motor of an electric vehicle. The motor controller 105 can include a device or one or more electrical component configured to control the performance of a motor. In certain examples, the motor controller can include an electric machine controller configured to control the performance of an electric machine, such as a generator or other electric machine.

In an example, the torque command value can include or otherwise be derived using information from the throttle or other electric vehicle speed or torque input (e.g., input from a user of the electric vehicle). In certain examples, the torque command value can be taken directly from the input from the user, or the torque command value can be modulated, such as by filtering the user input to obtain a smoother or more realistic response or acceleration, a more constant or stable speed or torque, or to apply one or more other driving features, such as traction control.

Generally, an electric vehicle can include certain components, such as a motor, a power source (e.g., a battery or other source), drive electronics, a power delivery system (e.g., a transmission), etc. In an example, the drive electronics can include the motor controller 105, an inverter, or other components. In various examples, the motor of the electric vehicle can include various types of electric motors, such as an alternating current (AC) induction motor, a synchronous AC motor, a direct current (DC) motor, a stepper motor, or other type of electric motor capable of providing power to propel an electric vehicle. In certain examples, the electric vehicle can include a ground based vehicle, an aquatic vehicle, an aircraft, or other type of vehicle capable of being propelled using a motor.

Figure 2:
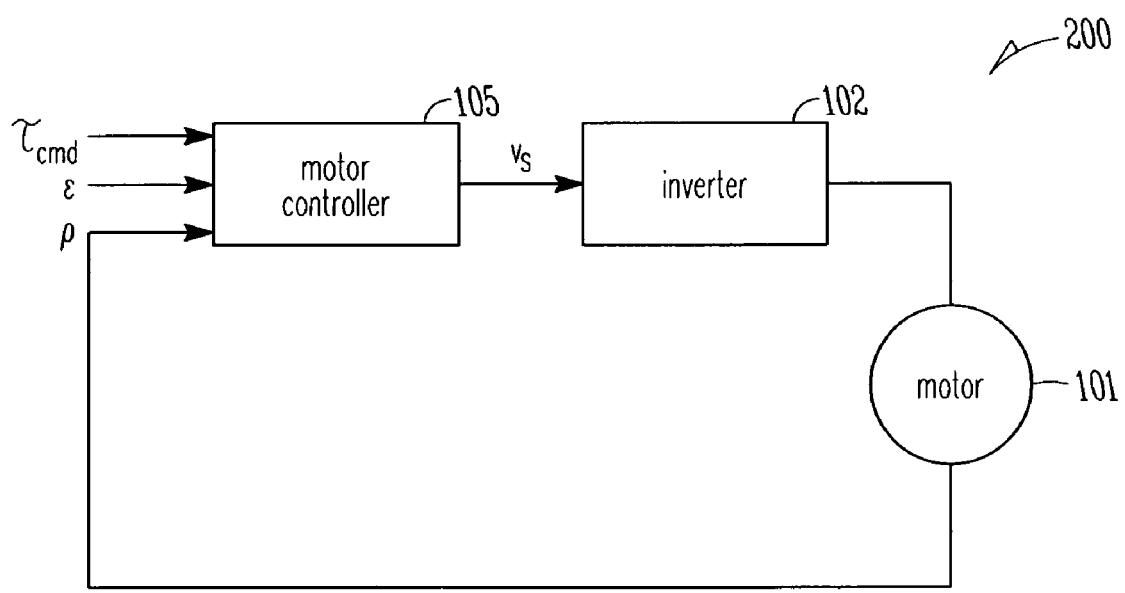
FIG. 2 illustrates generally an example of a system including a motor controller, an inverter, and a motor.

FIG. 2 illustrates generally an example of a system 200 including a motor 101, an inverter 102, and a motor controller 105. In an example, the motor controller 105 can be configured to receive a torque command value ($\tau_{cmd}$), an available energy signal ($\epsilon$), and at least one operating characteristic ($\rho$) of the motor 101, and to output a control signal ($V_s$) for controlling the motor 101.

In an example, the available energy signal may be comprised of a signal that indicates the available voltage in the electric vehicle. In certain examples, the electric vehicle can include a battery or other device capable of storing voltage, such as a capacitor. Thus, in certain examples, the available energy signal may be comprised of a signal that indicates the available voltage in the battery or other energy producing or energy storage device.

In an example, the at least one operating characteristic of the motor 101 can include a measured rotor speed ($\omega_r$), measured operating or phase current (e.g., $i_a$, $i_b$, or $i_c$), or other measured or estimated operating characteristic of the motor 101.

In certain examples, the control signal for controlling the motor of the electric vehicle can vary depending on the type of motor. For example, the motor can include a three-phase AC induction motor. The three-phase AC induction motor, in a variable torque application, requires AC power at a specified frequency or amplitude to create the desired torque. In this example, the motor controller 105 can be configured to produce a control signal including a voltage signal (e.g., $V_s$). In an example, the control signal or the voltage signal can include a vector quantity. In other examples, the motor controller 105 can be configured to produce a control signal including more than one DC voltage signal (e.g., $V_d$ and $V_q$, or $V_a$, $V_b$, and $V_c$, etc.) or to produce at least one other signal, such as at least one current signal or other AC or DC signal.

In the example of FIG. 2, the motor controller 105 is configured to output the control signal to an inverter 102. The inverter 102 can include an electronic circuit or component configured to convert DC power to AC power. In various examples, the inverter 102 can be included in the motor controller 105 so that the output of the motor controller 105 can be directly applied to the motor 101, or the inverter 102 can be a separate component from the motor controller 105 so that the output of the motor controller 105 is applied to the motor 101 through the inverter 102. In an example, the inverter 102 can be configured to receive the control signal (e.g., $V_s$) from the motor controller 105, convert the control signal into a corresponding AC power signal for the motor 101, and deliver the AC power signal to the motor 101. In various examples, at least one of the inverter 102 or the motor controller 105 is included in the drive electronics of the electric vehicle.

Figure 3:
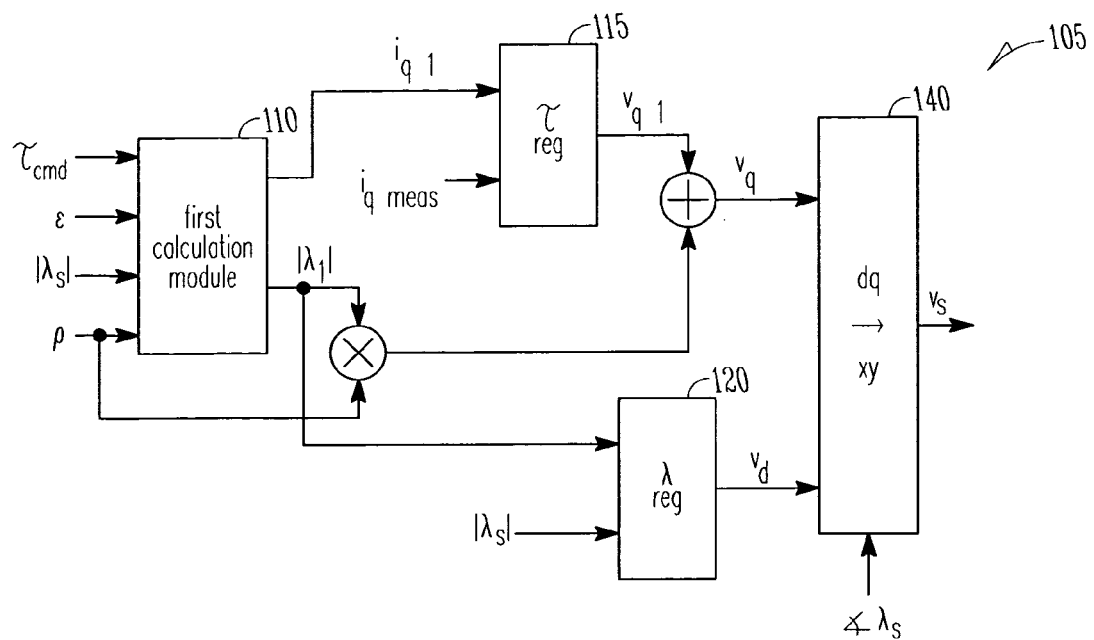
FIG. 3 illustrates generally an example of a motor controller including example motor controller components.

FIG. 3 illustrates generally an example of a motor controller 105 including a first calculation module 110, a torque ($\tau$) regulator 115, a flux ($\lambda$) regulator 120, and a rotating reference frame to stationary reference frame converter (dq→xy) 140.

In an example, the first calculation module 110 can be configured to calculate, at the received torque command value, a first flux value ($|\lambda_l|$) and a first torque-producing current value ($i_{ql}$) using the torque command value ($\tau_{cmd}$), the available energy signal ($\epsilon$), a magnitude of an estimated flux ($|\lambda_s|$), and the at least one operating characteristic ($\rho$) of the motor. In certain examples, the available energy signal can include a battery bus signal or a battery voltage signal, or the at least one operating characteristic can include a rotor speed ($\omega_r$) of the motor. In an example, the first flux value can be calculated to achieve a maximum efficiency of the electric vehicle. By achieving a maximum efficiency of the electric vehicle or minimizing power loss, the range or life of the power source or the vehicle can be extended. In certain examples, the first flux value corresponding to the maximum efficiency of the electric vehicle can be limited by a peak achievable flux of the motor or the electric vehicle at a specific operating point.

In an example, the torque regulator 115 or the flux regulator 120 can include a feedback mechanism or other regulator configured to stabilize or otherwise modulate or correct a difference between a measured value and a calculated value or a reference value.

In an example, the torque regulator 115 can be configured to output a first control value (e.g., a torque-related feedback control signal ($V_q$)) using the first torque-producing current value ($i_{ql}$) and a measured torque-producing current value ($i_{qmeas}$). In certain examples, the torque regulator 115 can be configured to output a preliminary control value (e.g., a first torque-related feedback control signal ($V_q'$)) using the first torque-producing current value ($i_{ql}$) and the measured torque-producing current ($i_{qmeas}$). The preliminary control value can be adjusted using the first flux value ($|\lambda_l|$) and the at least one operating characteristic ($\rho$) (e.g., the rotor speed ($\omega_r$)) of the motor to produce the first control value. In an example, the measured torque-producing current ($i_{qmeas}$) can be included as at least part of the at least one operating characteristic ($\rho$) of the motor.

In an example, the flux regulator 120 can be configured to output a second control value (e.g., a flux-related feedback control signal ($V_d$)) using the first flux value ($|\lambda_l|$) and the magnitude of an estimated flux ($|\lambda_s|$).

In an example, the rotating reference frame to stationary reference frame converter (dq→xy) 140 can be configured to convert the first control value and the second control value from the rotating reference frame into the control signal (e.g., $V_s$) in the stationary reference frame. In certain examples, the dq→xy 140 can include a converter or other device configured to perform an inverse park transform. In an example, the torque-related and flux-related feedback control signals can be converted using an angle of an estimated flux ($\angle\lambda_s$).

Figure 4:
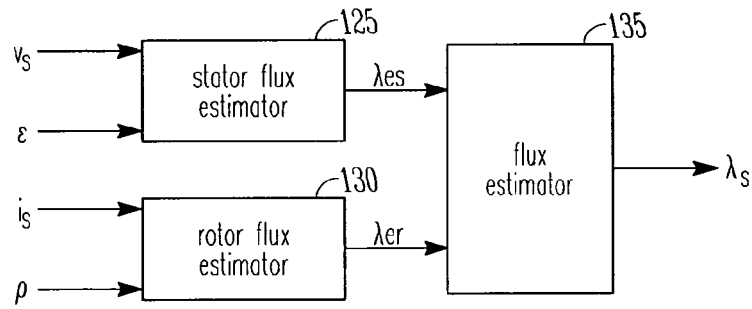
FIGS. 4-8 illustrate generally example motor controller components.

FIG. 4 illustrates generally example motor controller 105 components including a stator flux estimator 125, a rotor flux estimator 130, and a flux estimator 135.

In an example, the flux estimator 135 can be configured to calculate an estimated flux ($\lambda_s$) using a combination of an estimated stator flux ($\lambda_{es}$) and an estimated rotor flux ($\lambda_{er}$) of the motor. In the example of FIG. 4, the estimated stator flux ($\lambda_{es}$) can be calculated using the stator flux estimator 125, the estimated rotor flux and ($\lambda_{er}$) can be calculated using the rotor flux estimator 130, and the estimated flux ($\lambda_s$) can be calculated using the flux estimator 135.

In certain examples, the stator flux estimator 125 can be configured to calculate the estimated stator flux ($\lambda_{es}$) using the control signal ($V_s$) or an estimated phase voltage of the motor (e.g., the control signal ($V_s$) minus a voltage drop a stator winding for that phase). In an example, the stator flux estimator 125 can be configured to calculate the estimated stator flux ($\lambda_{es}$) using the control signal ($V_s$) or an estimated phase voltage of the motor coupled with the available energy signal ($\epsilon$). In certain examples, the stator flux estimator 125 can include a high-speed flux estimator or a voltage-based flux estimator.

In an example, the rotor flux estimator 130 can be configured to calculate the estimated rotor flux ($\lambda_{er}$) using the measured current ($i_s$) (e.g., the measured phase current or other measured current from the motor) and at least one operating characteristic ($\rho$) of the motor (e.g., the rotor speed ($\omega_r$) of the motor or other operating characteristic). In certain examples, the measured current ($i_s$) can include a vector quantity. Further, the flux estimator 135 can be configured to calculate the estimated flux ($\lambda_s$) using the estimated stator flux ($\lambda_{es}$) and the estimated rotor flux ($\lambda_{er}$). In certain examples, the rotor flux estimator 130 can include a low-speed flux estimator or a current-based flux estimator.

In an example, the stator flux estimator 125, the rotor flux estimator 130, or the flux estimator 135 can be configured to estimate at least one flux value such as is described in the commonly assigned Baglino et al. U.S. patent application Ser. No. 12/100,836, entitled "WEIGHTED FIELD ORIENTED MOTOR CONTROL FOR A VEHICLE," which is hereby incorporated by reference in its entirety, including its disclosure of estimating a flux, a rotor flux, or a stator flux.

Figure 5:
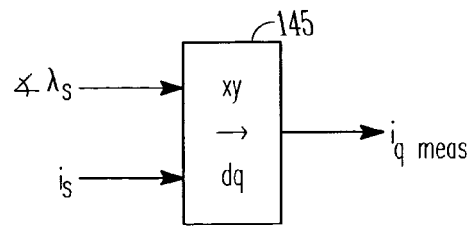

FIG. 5 illustrates generally an example motor controller component including a stationary reference frame to rotating reference frame converter (xy→dq) 145. In an example, the stationary reference frame to rotating reference frame converter (xy→dq) 145 can be configured to convert the measured current ($i_s$) and the angle of the estimated flux ($\angle\lambda_s$) from the stationary reference frame into the measured torque-producing current ($i_{qmeas}$) from the rotating reference frame. In certain examples, the xy→dq 145 can include a converter or other device configured to perform a forward park transform.

Figure 6:
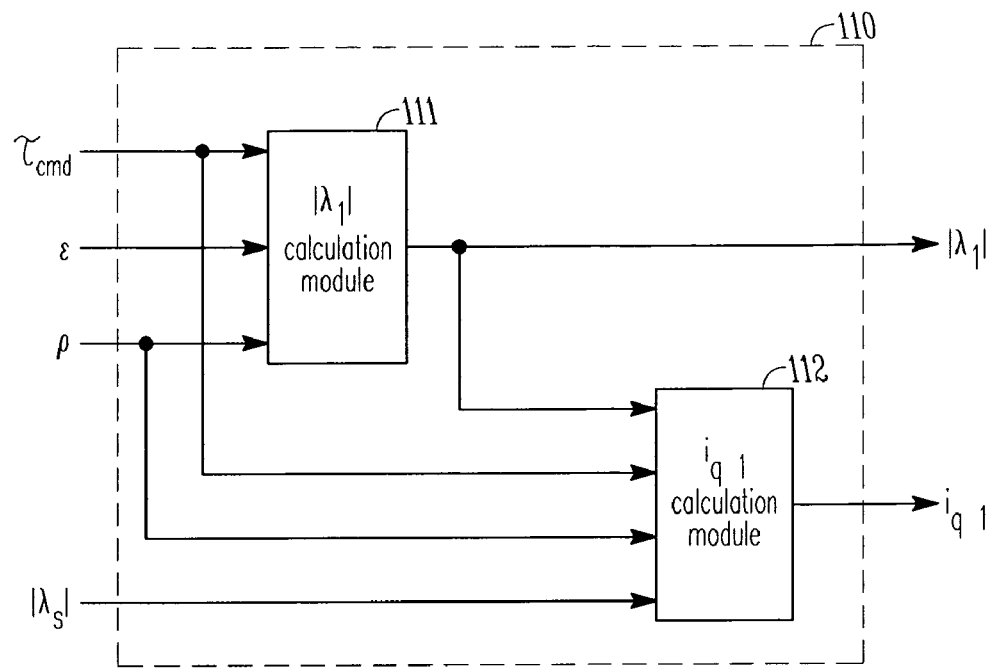

FIG. 6 illustrates generally an example of a first calculation module 110 including a first flux ($|\lambda_l|$) calculation module 111 and a first torque-producing current ($i_{ql}$) calculation module 112.

In an example, the first flux ($|\lambda_l|$) calculation module 111 can be configured to calculate the first flux value ($|\lambda_l|$) using the torque command value ($\tau_{cmd}$) and the available energy signal ($\epsilon$). In other examples, the flux ($|\lambda_l|$) calculation module 111 can be configured to calculate the first flux value ($|\lambda_l|$) using the torque command value ($\tau_{cmd}$), the available energy signal ($\epsilon$), and the at least one operating characteristic ($\rho$) (e.g., the rotor speed ($\omega_r$)) of the motor. In an example, the first flux value can be calculated using a relationship between the torque command value, the available energy signal, and the at least one operating characteristic of the motor, the relationship configured to calculate the first flux value to maximize the efficiency of the electric vehicle. In certain examples, the first flux value can be limited by a peak achievable flux value of the motor or the electric vehicle at a specific operating point. In an example, the efficiency can be maximized by minimizing energy loss in the electric vehicle, including at least one electric vehicle component (e.g., the motor, the drive electronics, the transmission, etc.). In an example, once the first flux value is established, then first torque-producing current value ($i_{ql}$) can be calculated.

In an example, the first torque-producing current ($i_{ql}$) calculation module 112 can be configured to calculate the first torque-producing current value ($i_{ql}$) using the first flux value ($|\lambda_l|$) and the torque command value ($\tau_{cmd}$). In other examples, the first torque-producing current ($i_{ql}$) calculation module 112 can be configured to calculate the first torque-producing current value ($i_{ql}$) using the first flux value ($|\lambda_l|$), the torque command value ($\tau_{cmd}$), the at least one operating characteristic ($\rho$) of the motor, and the magnitude of an estimated flux ($|\lambda_s|$). In an example, the first torque-producing current value can be calculated to produce the desired torque at a determinable (e.g., the most efficient) first flux value. In certain examples, the first torque-producing current value can be limited by a peak achievable torque-producing current of the motor or the electric vehicle at a specific operating point.

Figure 7:
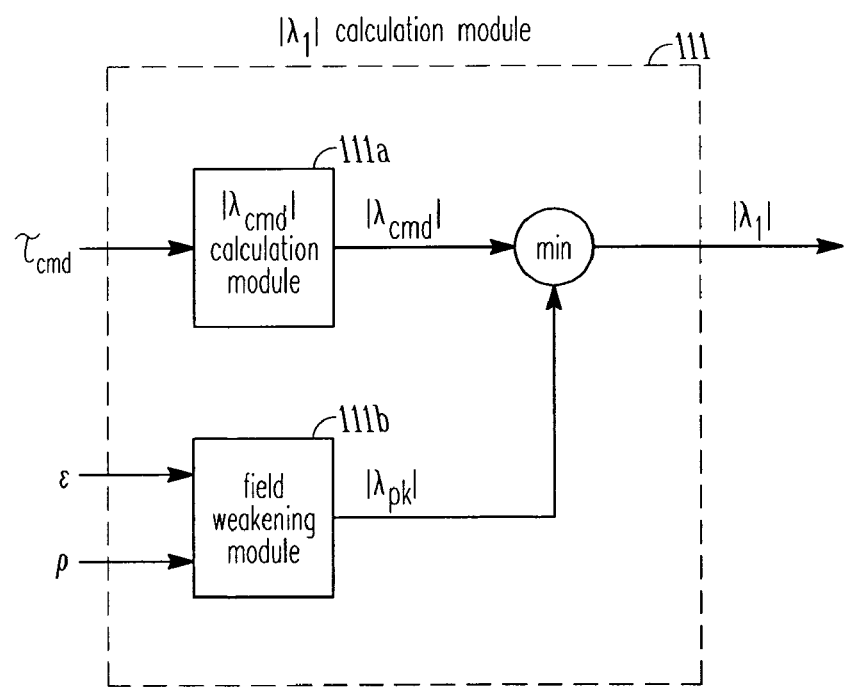

FIG. 7 illustrates generally an example of a first flux ($|\lambda_l|$) calculation module 111 including a flux command ($|\lambda_{cmd}|$) calculation module 111a and a field weakening module 111b.

In an example, the flux command ($|\lambda_{cmd}|$) calculation module 111a can be configured to calculate a flux command value ($|\lambda_{cmd}|$) using the torque command value ($\tau_{cmd}$). In an example, the flux command value can be calculated using a relationship between the between the flux command value and the torque command value. In an example, the relationship can be configured to maximize the efficiency of at the electric vehicle (e.g., by minimizing energy loss in the electric vehicle). In an example, the efficiency of the electric vehicle can include the efficiency of at least one of the motor, the power source (e.g., a battery or other source), the drive electronics, the power delivery system (e.g., a transmission), or other components of the electric vehicle having variable efficiency dependant upon at least one of the torque, the flux, torque-producing flux, or other variable parameter of the motor or motor controller.

In an example, for a given torque command value, the first flux value can be modulated while monitoring the power draw of the electric vehicle (e.g., using the available energy signal). The first flux value can be established as the flux value corresponding to a minimal power draw of the electric vehicle at the given torque command value. In various examples, the first flux value can be calculated corresponding to varying operating conditions. For example, if the desired torque value is commonly at full torque, the first flux value can be calculated corresponding to the maximum torque per amp in the electric vehicle.

In an example, a look-up table can be created using the first flux value corresponding to the minimal power draw of the electric vehicle for at least one torque command value. In an example, the flux command ($|\lambda_{cmd}|$) calculation module 111a can be configured to receive a torque command value and calculate, using the look-up table, the first flux value corresponding to the maximum efficiency or minimum power draw or loss of the electric vehicle at the received torque command value. In other examples, the maximum efficiency or minimum power draw or loss of the electric vehicle can be calculated during run-time (e.g., such as by modulating the first flux value for a received torque command value during run-time to find the maximum efficiency point).

In an example, the field weakening module 111b can be configured to calculate a peak flux value ($|\lambda_{pk}|$) using the available energy signal ($\epsilon$) and at least one operating characteristic ($\rho$) of the motor. In certain examples, the at least one operating characteristic of the motor can include the measured rotor speed ($\omega_r$). In an example, as the available energy in the electric vehicle changes, and as the speed of the rotor, or other operating characteristic of the motor, changes, the peak achievable flux can change. In certain examples, the peak achievable flux can be calculated using a relationship between at least one of the available energy of the electric vehicle or an operating characteristic of the motor. In other examples, the peak achievable flux can be derived, such as by testing the motor or motor controller through at least a portion of the operating range of the motor or the electric vehicle to find the peak achievable flux at a specific operating point and applying the derived results of the testing to a run-time operating point of the motor or of the electric vehicle.

In an example, the flux ($|\lambda_l|$) calculation module 111 can be configured to calculate the first flux value ($|\lambda_l|$) as the minimum of the calculated flux command value ($|\lambda_{cmd}|$) and the peak flux value ($|\lambda_{pk}|$). In an example, the first flux value can correspond to the flux value having a maximum efficiency at a received torque command value, but limited by the peak achievable flux of the motor or the electric vehicle.

Figure 8:
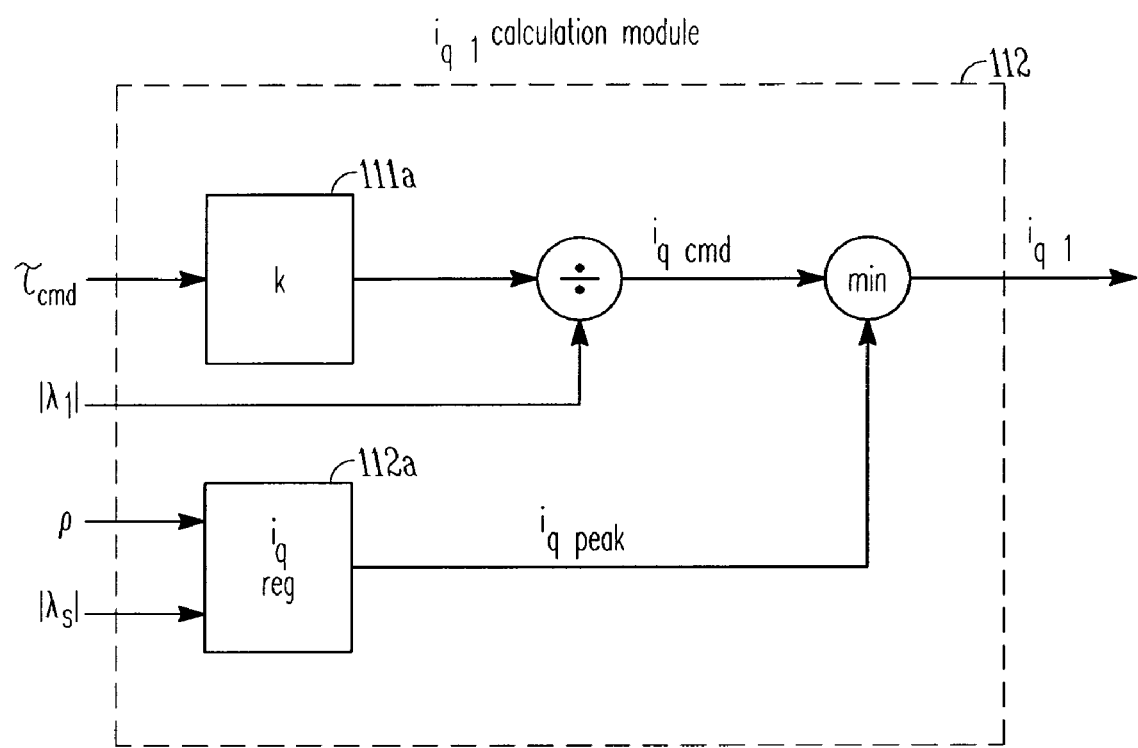

FIG. 8 illustrates generally an example of a first torque-producing current ($i_{ql}$) calculation module 112 including a torque-producing current ($i_q$) regulator 112a.

In an example, the first torque-producing current ($i_{ql}$) calculation module 112 can be configured to calculate a torque-producing current command value ($i_{qcmd}$) as a linear function of torque command value ($\tau_{cmd}$) and the first flux value ($|\lambda_l|$). The torque-producing current command value corresponds to the required torque-producing current to produce the torque command value at the first flux value. In the example of FIG. 8, the torque-producing current command value is calculated according to a linear relationship between the torque command value, K (where K is a constant determined by the number of poles or phases in the motor), and the first flux value.

In an example, the torque-producing current ($i_q$) regulator 112a can be configured to calculate a peak torque-producing current value ($i_{qpeak}$) using the at least one operating characteristic ($\rho$) of the motor and the magnitude of the estimated flux ($|\lambda_s|$). In an example, the peak torque-producing current value can change as a function of at least one operating characteristic (e.g., the measured rotor speed ($\omega_r$)) of the motor and the estimated flux of the motor.

In an example, the first torque-producing current ($i_{ql}$) calculation module 112 can be configured to compute the first torque-producing current value ($i_{ql}$) as a function of the torque-producing current command value and the peak torque-producing current value. In certain examples, the torque-producing current command value can be limited by the peak torque-producing current value.

Generally, the torque command value, the first flux value, the first torque-producing current value, the command signal, or other value can include a single value, or can include a real-time or run-time value that changes, such as depending on user input or other operating change. In an example, the motor controller 105 can be configured to receive a run-time torque command signal and compute or adjust a run-time flux value of the motor during operation of the motor in the electric vehicle. In certain examples, the run-time flux value can be adjusted according to the run-time torque command signal, and the adjusting can include according to a maximum efficiency of the electric vehicle. Further, one or more of the values above (e.g., the estimated flux ($\lambda_s$) the estimated stator flux ($\lambda_{es}$), the estimated rotor flux ($\lambda_{er}$), the measured current ($i_s$), etc.) can include a scalar quantity or a vector quantity.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

What is claimed is:

1. An apparatus in an electric vehicle, comprising:
   a motor controller, said motor controller including a first flux value calculation module, said motor controller configured to:
   receive a torque command value;
   calculate a flux command value as a function of the torque command value;
   calculate a peak flux value as a function of an available voltage in the electric vehicle and of an operating characteristic of a motor of the electric vehicle;
   calculate a first flux value using the flux command value and the peak flux value, the first flux value corresponding to a determinable efficiency of the electric vehicle;
   calculate a first torque-producing current value as a function of the torque command value and of the first flux value; and
   calculate a control signal, using the first flux value and the first torque-producing current value to control a motor of an electric vehicle.

2. The apparatus of claim 1, wherein the first flux calculation module determines the available electrical energy in the electric vehicle corresponding to a battery bus voltage of a battery of the electric vehicle, and wherein the first flux calculation module determines the at least one motor characteristic of the motor corresponding to a rotor speed of the motor.

3. The apparatus of claim 1, wherein the first flux value calculation module calculates the flux command value using a relationship between the torque command value, the flux command value, and an efficiency of the electric vehicle at the flux command value and at the torque command value.

4. The apparatus of claim 3, wherein the efficiency of the electric vehicle at the flux command value and at the torque command value includes a measured efficiency at the flux command value and at the torque command value.

5. An apparatus in an electric vehicle, comprising:
   a motor controller, said motor controller including a first torque-producing current value calculation module, said motor controller configured to:
   receive a torque command value;
   calculate, at the torque command value, a first flux value corresponding to a determinable efficiency of the electric vehicle;
   calculate a torque-producing current command value as a function of the torque command value and of the first flux value;
   calculate a peak torque-producing current value as a function of an estimated operating flux of the motor and of an operating characteristic of the motor;
   calculate a first torque-producing current value using the torque-producing current command value and the peak torque-producing current value; and
   calculate a control signal, using the first flux value and the first torque-producing current value to control a motor of an electric vehicle.

6. An apparatus comprising:
   a motor controller configured to receive a torque command and to calculate a first flux value corresponding to a determinable efficiency of an electric vehicle as a function of said torque command value and to calculate a first torque-producing current value as a function of the torque command value and of the first flux value;
   a flux regulator to calculate a first control value as a function of the first flux value and an estimated operating flux of a motor; and
   a torque regulator to calculate a second control value as a function of the first torque-producing current value and of a measured operating current of the motor,
   wherein the motor controller calculates a control signal using the first control value and the second control value to control the motor of the electric vehicle.

7. The method of claim 6, wherein the torque regulator calculates the second control value as a function of the first torque-producing current value, of the measured operating current of the motor, of the first flux value, and of a rotor speed of the motor.

8. A method of controlling a motor in an electric vehicle, the method comprising:
   receiving a torque command value;
   calculating a flux command value as a function of the torque command value;
   calculating a peak flux value as a function of an available voltage in the electric vehicle and of an operating characteristic of the motor;
   calculating a first flux value using the flux command value and the peak flux value, wherein the first flux value corresponds to a determinable efficiency of the electric vehicle;
   calculating a first torque-producing current value as a function of the torque command value and of the first flux value; and
   using the first flux value and the first torque-producing current value to control the motor to propel the electric vehicle.

9. The method of claim 8, wherein the available voltage in the electric vehicle corresponds to a battery bus voltage of a battery of the electric vehicle and wherein the at least one motor characteristic corresponds to a rotor speed of the motor.

10. The method of claim 8, wherein the flux command value is calculated using a relationship between the torque command value, the flux command value, and an efficiency of the electric vehicle.

11. The method of claim 10, wherein the efficiency of the electric vehicle corresponds to a measured efficiency of the electric vehicle at the flux command value and at the torque command value.

12. A method of controlling a motor in an electric vehicle, the method comprising:
   receiving a torque command value;
   calculating, at the torque command value, a first flux value corresponding to a determinable efficiency of the electric vehicle;
   calculating a torque-producing current command value as a function of the torque command value and of the first flux value;
   calculating a peak torque-producing current value as a function of an estimated operating flux of the motor and of an operating characteristic of the motor;
   calculating a first torque-producing current value using the torque-producing current command value and the peak torque-producing current value; and using the first flux value and the first torque-producing current value to control the motor to propel the electric vehicle.

13. A method of controlling a motor in an electric vehicle, the method comprising:
   receiving a torque command value;
   calculating, at the torque command value, a first flux value corresponding to a determinable efficiency of the electric vehicle;
   calculating a first torque-producing current value as a function of the torque command value and of the first flux value;
   calculating a first control value as a function of the first flux value and an estimated operating flux of the motor;
   calculating a second control value as a function of the first torque-producing current and of a measured operating current of the motor;
   calculating a control signal using the first control value and the second control value; and
   controlling the motor using the control signal.

14. The method of claim 13, wherein the calculating of the second control value includes calculating the second control value as a function of the first torque-producing current, of the measured operating current of the motor, of the first flux value, and of a rotor speed of the motor.

* * * * *